(12) United States Patent
Masuda et al.

(10) Patent No.: US 11,208,592 B2
(45) Date of Patent: Dec. 28, 2021

(54) PREPARATION METHOD OF FORMAMIDINIUM LEAD HALIDE PEROVSKITE QUANTUM DOTS

(71) Applicants: TOYOTA JIDOSHA KABUSHIKI KAISHA, Toyota (JP); The University of Electro-Communications, Chofu (JP)

(72) Inventors: Taizo Masuda, Yokohama (JP); Kiyoto Sasaki, Shizuoka-ken (JP); Shen Qing, Chofu (JP); Feng Liu, Chofu (JP); Yaohong Zhang, Chofu (JP); Chao Ding, Chofu (JP)

(73) Assignees: TOYOTA JIDOSHA KABUSHIKI KAISHA, Toyota (JP); THE UNIVERSITY OF ELECTRO-COMMUNICATIONS, Chofu (JP)

( * ) Notice: Subject to any disclaimer, the term of this patent is extended or adjusted under 35 U.S.C. 154(b) by 274 days.

(21) Appl. No.: 16/420,351

(22) Filed: May 23, 2019

(65) Prior Publication Data
US 2019/0375984 A1 Dec. 12, 2019

(30) Foreign Application Priority Data
Jun. 6, 2018 (JP) .............. JP2018-108912

(51) Int. Cl.
| | | |
|---|---|---|
| C09K 11/06 | (2006.01) | |
| C09K 11/66 | (2006.01) | |
| C07F 7/24 | (2006.01) | |
| C01G 21/16 | (2006.01) | |

(52) U.S. Cl.
CPC .............. *C09K 11/06* (2013.01); *C01G 21/16* (2013.01); *C07F 7/24* (2013.01); *C09K 11/664* (2013.01); *C01P 2002/34* (2013.01); *C09K 2211/10* (2013.01)

(58) Field of Classification Search
CPC ......... C07F 7/24; C09K 11/664; C01G 21/16; C01P 2002/34
See application file for complete search history.

(56) References Cited

U.S. PATENT DOCUMENTS 10,263,043 B2 4/2019 Fischer et al.

FOREIGN PATENT DOCUMENTS

| JP | 2018-503060 A | 2/2018 |
|---|---|---|
| WO | 2018025445 A1 | 2/2018 |

OTHER PUBLICATIONS

Loredana Protesescu et al., "Dismantling the 'Red Wall' of Colloidal Perovskites: Highly Luminescent Formamidinium and Formamidinium-Cesium Lead Iodide Nanocrystals," American Chemical Society, ACS Nano 2017, 11, 3119-3134.
Ioannis Lingos et al., ACS Nano, May 12, 2018,12(6), pp. 5504-5517, https://doi.org/10.1021/acsnano.8b01122.

*Primary Examiner* — C Melissa Koslow
(74) *Attorney, Agent, or Firm* — Dickinson Wright, PLLC

(57) ABSTRACT

There is provided a method of preparing formamidinium lead halide perovskite quantum dots having a photoluminescence quantum yield higher than before. The disclosed method comprises steps of: preparing a lead halide solution by dissolving lead halide (II), oleic acid and oleylamine in a nonpolar solvent; preparing a formamidinium solution by dissolving formamidine acetate salt and oleic acid in a nonpolar solvent; mixing the formamidinium solution and the lead halide solution to form quantum dots; and centrifuging the mixed solution to obtain sediment; dispersing the sediment in a nonpolar solvent to prepare a crude quantum dot solution; mixing the crude quantum dot solution with methyl acetate; and centrifuging the crude quantum dot solution mixed with the methyl acetate to obtain sediment as purified quantum dots. The durable quantum dots are stably formed by injecting the lead halide solution into the formamidinium solution heated at 60° C.-90° C.

9 Claims, 2 Drawing Sheets

FIG.1A
FIG.1B
FIG.1C
FIG.2
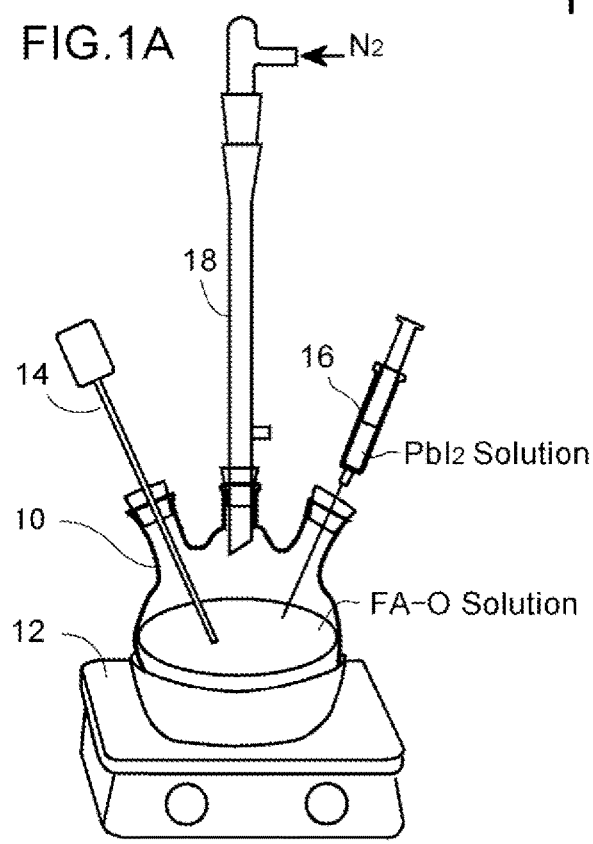
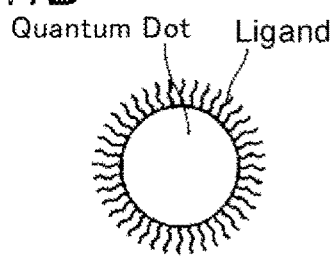
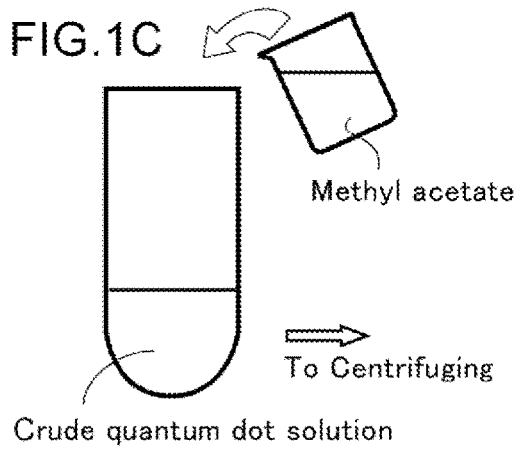
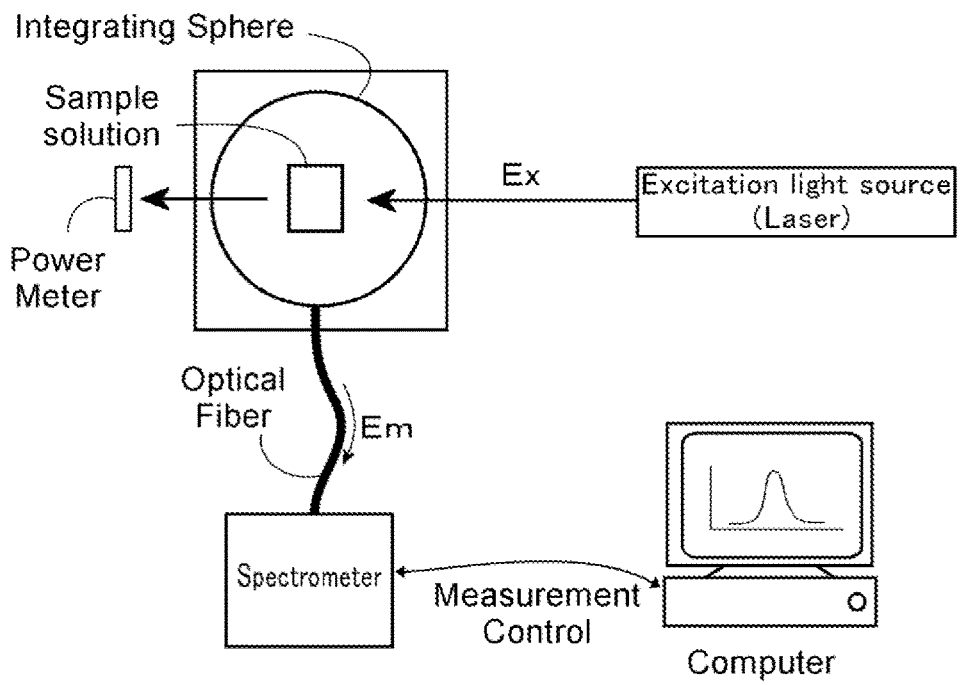

PREPARATION METHOD OF FORMAMIDINIUM LEAD HALIDE PEROVSKITE QUANTUM DOTS

RELATED APPLICATION

This application claims priority to Japanese Patent Application No. 2018-108912, filed on Jun. 6, 2018, including the specification, drawings and abstract, the entire disclosure of which is incorporated herein by reference.

TECHNICAL FIELD

The subject disclosure relates to a preparation method of quantum dots, and more specifically, to a preparation method of formamidinium lead halide perovskite quantum dots.

BACKGROUND ART

Perovskite quantum dots (quantum dots having perovskite crystal structure) attract attention in recent years as fluorescence materials which have a high photoluminescence quantum yield (the ratio of the count of photons emitted from a substance to the count of photons absorbed into the substance) and of which emission wavelength is adjustable in comparatively wide ranges. For the perovskite quantum dots, there are known those formed of various components, and especially, the perovskite quantum dots composed of formamidinium lead halide, such as formamidinium lead iodide, have, as well as the high photoluminescence quantum yield, a characteristic that their emission wavelength band is around 800 nm and they absorb light in the continuous wavelength band shorter than the emission wavelength and their emission wavelength band width is narrow (the full width at half maximum of the peak in the emission wavelength band is about 50 nm or less in its emission spectrum.), so that those can absorb energy of components in wide range wavelength bands, like the sunlight, etc., and emit the absorbed energy as light of components in a comparatively narrow specific wavelength band while compressing the energy into high density (Spectrum compression), and therefore, the formamidinium lead halide perovskite quantum dots are expected to be used in applications to various technologies using the sunlight energy. An example of the preparation method of such perovskite quantum dots composed of formamidinium lead halide and an example of their application to LED are described, for instance, in Non-patent document 1. Patent document 1 also discloses examples of perovskite crystal particles composed of formamidinium lead halide, etc. which may also be used as quantum dots. Patent document 2 discloses formation of a photoelectric conversion element and a solar cell with an outstanding durability and an outstanding photoelectric conversion efficiency in the near-infrared light region by using a light absorption layer formed by mixing perovskite compound composed of formamidinium lead halide etc. and quantum dots composed of lead sulfide, etc.

PRIOR TECHNICAL DOCUMENTS

Patent Documents

Patent document 1: Japanese Laid-open Publication 2018-503060

Patent document 2: International publication 2018/025445

Non-Patent Documents

Non-patent document 1: ACS Nano, 2017, 11, 3119-3134, "Dismantling the "Red Wall" of Colloidal Perovskites: Highly Luminescent Formamidinium and Formamidinium-Cesium Lead Iodide Nanocrystals", L. Protesescu, et al.

SUMMARY

Technical Problem

In Non-patent document 1, briefly, it has been reported that formamidinium lead iodide perovskite quantum dots were formed in a heated lead iodide solution by a hot injection method where a FA acetate solution (formamidine acetate salt/oleic acid/octadecane solution) is injected into the lead iodide solution (lead iodide (II) powder/oleic acid/oleylamine/octadecane mixed solution), and when the product were purified by dispersing the crude product in an acetonitrile solution (toluene:acetonitrile=3:1) and centrifuging it so as to remove impurities therefrom, there were prepared perovskite quantum dots whose emission wavelength peak was in 770 to 780 nm and whose photoluminescence quantum yield exceeded 70%. In this respect, according to the research of the inventors of the present disclosure, it has been found that it is possible to prepare formamidinium lead halide perovskite quantum dots exhibiting a photoluminescence quantum yield higher than ever (about 80%-100%) by improving the method of purifying the crude quantum dot product so as to removing impurities therefrom. Furthermore, according to the experiments by the inventors of the present disclosure, when quantum dots were prepared by the method of the above-mentioned non-patent document 1, in most results, the solutions turned transparent and their light-emitting abilities were lost within about 2 hours after the preparation (As shown later, the measured value of the photoluminescence quantum yield became 0%, also.). This is considered to be because the durability of the formed quantum dots is too low and the quantum dots decompose at an early stage. Then, in the research for the formation method of quantum dots, the inventors of the present disclosure has found a formation method of quantum dots which enables to stably form formamidinium lead halide perovskite quantum dots which do not lose their light-emitting abilities for at least one month, while maintaining their photoluminescence quantum yield.

Thus, one object of the present disclosure is to provide a preparation method of quantum dots, enabling to prepare formamidinium lead halide perovskite quantum dots which achieve a photoluminescence quantum yield higher than ever.

Moreover, another object of the present disclosure is to provide a preparation method of quantum dots, enabling to form more stably than ever highly durable formamidinium lead halide perovskite quantum dots which do not lose their light-emitting abilities for more than one month, while maintaining their photoluminescence quantum yield.

Solution to Problem

According to one embodiment, the above-mentioned object is achieved by a method of preparing formamidinium lead halide perovskite quantum dots, comprising steps of:

(a) preparing a lead halide solution by dissolving lead halide (II), oleic acid and oleylamine in a nonpolar solvent;

(b) preparing a formamidinium solution by dissolving formamidine acetate salt and oleic acid in a nonpolar solvent;

(c) mixing the formamidinium solution and the lead halide solution with heating to form formamidinium lead halide perovskite quantum dots;

(d) purifying the quantum dots by centrifuging the mixed solution of the formamidinium solution and the lead halide solution in which the quantum dots have been formed to obtain sediment; dispersing the sediment in a nonpolar solvent to prepare a crude quantum dot solution; mixing the crude quantum dot solution with methyl acetate; and centrifuging the crude quantum dot solution mixed with the methyl acetate to obtain sediment as purified quantum dots.

In the above-mentioned structure, "formamidinium lead halide perovskite quantum dots" are quantum dots in which formamidinium (FA) ions, halogen ions and lead ions form perovskite crystal structure. Here, although the halogen ions are typically iodine ions, not limited thereto, at least part of the halogen ions may be bromine ions, chlorine ions, etc. instead of iodine ions. Accordingly, although lead halide (II) is typically lead iodide (II), but at least a part of it may be lead bromide (II) or lead chloride (II). The nonpolar solvents in the steps of "preparing a lead halide solution", and "preparing a formamidinium solution", each may be an arbitrary solvent in which solutes, such as lead halide (II), oleic acid, oleylamine, and formamidine acetate salt, can be dispersed and dissolved, and those may be typically octadecane, etc. an arbitrary nonpolar solvent whose boiling point is higher than the temperature demanded in the processes of dispersing and dissolving the above-mentioned solutes and the dehydration and deoxidation process of the solvent (for example, 120° C.-130° C.) and in which the above-mentioned solute can remain stably dispersed. In the steps of preparing a lead halide solution and preparing a formamidinium solution, it is preferable to appropriately conduct a dehydration process and/or a deoxidation process by performing a degassing process while heating the solutions. The "nonpolar solvent" used in the step of "purifying quantum dots" may be, such as toluene etc., an arbitrary nonpolar solvent in which formamidinium lead halide perovskite quantum dots, formed by mixing the formamidinium solution and lead halide solution, can be stably dispersed in a colloidal state. In this regard, hereinafter, the term, "quantum dots", indicates formamidinium lead halide perovskite quantum dots, unless noted otherwise.

In the above-mentioned preparation method of quantum dots in the present disclosure, with respect to the process of purifying quantum dots formed in the mixed solution of the lead halide solution prepared by dissolving lead halide (II), oleic acid, and oleylamine in a nonpolar solvent and the formamidinium solution prepared by dissolving formamidine acetate salt and oleic acid in a nonpolar solvent, as noted, the crude quantum dot solution is prepared by dispersing in the nonpolar solvent the sediment obtained by centrifuging the mixed solution in which the quantum dots have been formed, and after the crude quantum dot solution is mixed with methyl acetate, this mixed solution is centrifuged. Then, the supernatant liquid contains solute impurities in the crude quantum dot solution, such as lead halide (II), formamidine acetate salt and those ions, which do not form the quantum dots, oleic acid, oleylamine, etc., while quantum dots are obtained as the sediment. And, in the measurement of the photoluminescence quantum yield of the obtained quantum dots (sediment) dispersed in a non-polar solvent, such as toluene, surprisingly, it has been found out that 80%-100% of the photoluminescence quantum yield is obtained, which far exceeds the value (about 70%) of quantum dots prepared by the method in the prior art. Namely, in purifying quantum dots from a crude quantum dot solution, it has been found that it is possible to prepare quantum dots which achieves the photoluminescence quantum yield far beyond those in the prior art only by using methyl acetate for the solvent for their purification. Furthermore, in the prior art, in order to purify from a crude quantum dot solution quantum dots exhibiting the photoluminescence quantum yield of about 70%, it is required to repeat at least twice the processes of dispersion of crude quantum dots into an acetonitrile solution and centrifugal separation thereof. On the other hand, as noted above in the present disclosure, it has been found that, when methyl acetate is used, the solutes which do not form the quantum dots are removed by only one time of centrifugal separation after mixing the crude quantum dot solution with methyl acetate, and the quantum dots which exhibit the photoluminescence quantum yield reaching to 80%-100% can be prepared. In this connection, in the above-mentioned step of purifying the quantum dots, the volume ratio of the crude quantum dot solution and methyl acetate in the mixing may typically be substantially 1:1.

Moreover, with respect to the step of forming quantum dots in the above-mentioned preparation method of quantum dots in the present disclosure, according to the research by the inventors of the present disclosure, it has been found that when the mixing of the formamidinium solution and the lead halide solution is performed under a temperature condition between 60° C. and 90° C., it is possible to form highly durable quantum dots which do not lose their light-emitting ability for more than one month while maintaining their photoluminescence quantum yield. Thus, in the step of forming quantum dots in the above-mentioned method of the present disclosure, preferably, the formamidinium solution and the lead halide solution are mixed under a temperature condition between 60° C. and 90° C.

Furthermore, with respect to the step of forming quantum dots, according to the research by the inventors of the present disclosure, it has been found that it is possible to form the quantum dots, durable as noted, and exhibiting the photoluminescence quantum yield reaching to 80%-100%, preferably when the molar ratio of lead ions ($Pb^{2+}$) and formamidinium ions is between 1:3.75 and 1:15, and more preferably when the molar ratio of lead ions and formamidinium ions is at substantially 1:11.25. Accordingly, in the step of forming quantum dots in the above-mentioned method of the present disclosure, preferably, the formamidinium solution and the lead halide solution are mixed such that the molar ratio of lead ions ($Pb^{2+}$) and formamidinium ions is to be preferably between 1:3.75 and 1:15, and to be more preferably at substantially 1:11.25.

By the way, in the mixing of the formamidinium solution and lead halide solution for the formation of the quantum dots, in order to form the durable quantum dots exhibiting the photoluminescence quantum yield reaching to 80%-100% as noted, it is preferable that formamidinium ions are present much more than lead ions in their molar ratio in the mixed solution, and also, it is preferable that the volume of the formamidinium solution is much more than that of the lead halide solution. And further, it is preferable that the formamidinium solution and lead halide solution are mixed as promptly as possible. In this respect, in the case that the formamidinium solution is injected with a syringe, etc. into a heated lead halide solution as in the method of the prior art, although the mixing of the solutions is achieved promptly, the temperature of a large amount of the formamidinium solution to be injected falls when it is loaded in the syringe, etc., and after this, when the formamidinium solution is injected into the lead halide solution, the temperature of the mixed solution falls easily, and thereby, it becomes difficult to reproducibly and stably form durable quantum dots. Then, in accordance with the research by the inventors of the present disclosure, it has been found that durable quantum dots can be stably formed reproducibly by injecting the lead halide solution into the heated formamidinium solution (In this case, since the volume of the lead halide solution to be injected is smaller than that of the formamidinium solution, the temperature of the mixed solution cannot fall easily while the mixing of the solutions is achieved promptly.). Thus, in the step of forming quantum dots in the above-mentioned method of the present disclosure, preferably, the formamidinium solution and lead halide solution may be mixed by injecting the lead halide solution into the formamidinium solution.

Further, according to the above-mentioned knowledge, durable quantum dots can be reproducibly and stably formed by the manner of injecting the lead halide solution into the formamidinium solution. Accordingly, in another aspect of the present disclosure, the above-mentioned object is achieved by a method of preparing formamidinium lead halide perovskite quantum dots, comprising steps of:

(e) preparing a lead halide solution by dissolving lead halide (II), oleic acid and oleylamine in a nonpolar solvent;

(f) preparing a formamidinium solution by dissolving formamidine acetate salt and oleic acid in a nonpolar solvent;

(g) forming formamidinium lead halide perovskite quantum dots by injecting the lead halide solution into the formamidinium solution heated at 60° C. to 90° C.

Effects

Thus, according to the method of preparing quantum dots of the present disclosure, by using methyl acetate, instead of the acetonitrile solution, for the solvent for the purification of quantum dots from a crude quantum dot solution, it becomes possible to prepare formamidinium lead halide perovskite quantum dots having an emission wavelength characteristic that the emission wavelength band is around 800 nm and the full width at half maximum of the peak of the emission wavelength band becomes about 50 nm or less, achieving a photoluminescence quantum yield higher than before. In the step of purifying quantum dots, the procedure of the mixing of the crude quantum dot solution with methyl acetate and centrifugal separation thereof may be performed only 1 time, and therefore, advantageous merits, such as shortening of the preparation process and the reduction of the amount of solvent used, are also achieved. Moreover, in the step of mixing the formamidinium solution and lead halide solution to form quantum dots, by the manner of injecting the lead halide solution into the formamidinium solution, it becomes possible to achieve both the preferable molar ratio of lead ions and formamidinium ions and the preferable temperature condition for the formation of the quantum dots, and thereby durable quantum dots can be reproducibly and stably formed.

Other purposes and advantages of the present disclosure will become clear by explanations of the following preferable embodiments.

BRIEF DESCRIPTIONS OF DRAWINGS

FIG. 1A schematically shows the process of mixing a lead halide solution and a formamidinium solution to form quantum dots in the method of preparing quantum dots in the present embodiment. FIG. 1B is a schematic drawing of a quantum dot formed in the method of the present embodiment. FIG. 1C schematically shows the process of purifying quantum dots in the present embodiment.

FIG. 2 is a schematic drawing of a system for measuring a quantum yield of quantum dots prepared in this embodiment.

EXPLANATIONS OF REFERENCE NUMERALS

Figure 3:
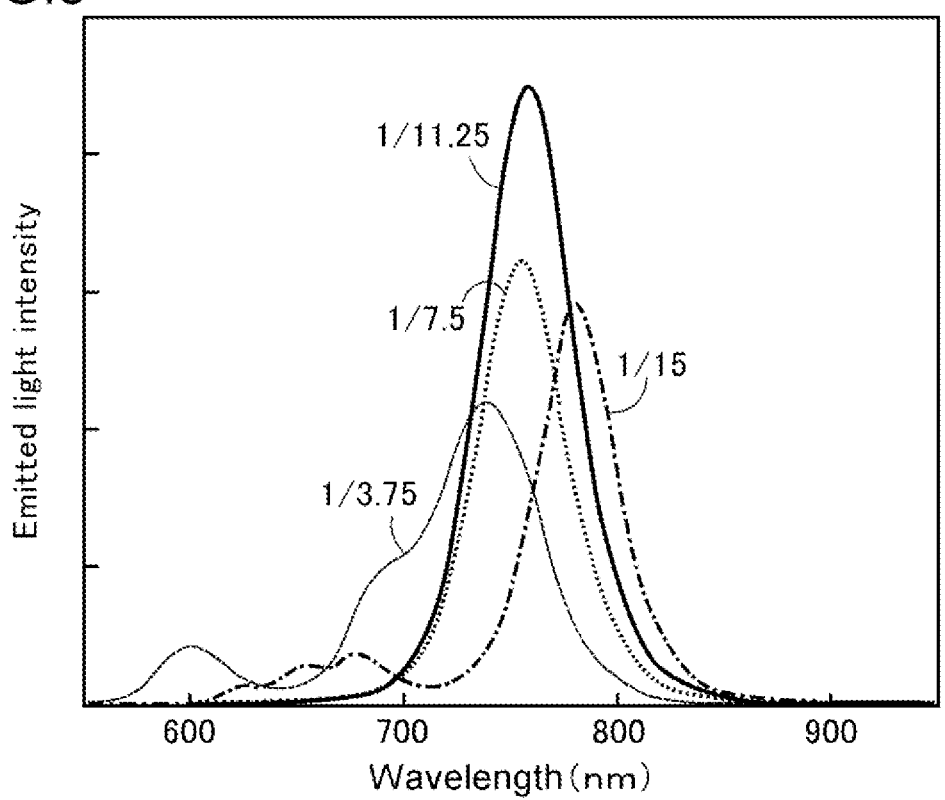
FIG. 3 shows the emission spectrum of quantum dots prepared in accordance with the method of preparing quantum dots according to the present embodiment. The ratio attached to each graph in the drawing shows the mixed molar ratio of lead ions and formamidinium ions (lead ions/formamidinium ions).

10 Three-neck flask
12 Heating mantle
14 Temperature sensor
16 Syringe
18 Gas transport pipe

DESCRIPTIONS OF EMBODIMENTS

In the followings, preferable embodiments of the present disclosure are described in detail. In the drawings, the same references indicate the same sites.

Preparation Steps of Quantum Dots

In the preparation of formamidinium lead halide perovskite quantum dots by this embodiment, the following processes: (a) preparing a lead halide solution, (b) preparing a formamidinium solution, (c) mixing the lead halide solution and formamidinium solution (formation of quantum dots), and (d) purifying the quantum dots, are performed. Hereinafter, each process will be explained in detail.

(a) Preparation of a Lead Halide Solution

In the preparation of a lead halide solution, the powder of lead halide (II) is mixed in a nonpolar solvent, and oleic acid and oleylamine are further added therein, and then, it is mixed until the lead halide (II) is completely dissolved. The lead halide (II) is typically lead iodide (II), but, at least part of it may be lead bromide (II) or lead chloride (II). The nonpolar solvent may be an arbitrary solvent in which lead halide (II), formamidine acetate salt, oleic acid and oleylamine can be dissolved, typically octadecane, etc. In this regard, since it is preferable that water and oxygen have been removed from the nonpolar solvent, the nonpolar solvent or that in which the lead halide has been mixed is degassed under a temperature condition where water is evaporated, for example a condition of 120-130° C., and after this dehydration and deoxidation process, it may be filled with nitrogen gas (Nitrogen substitution). It is preferable to add the oleic acid and oleylamine after the dehydration and deoxidation process and the nitrogen substitution, in order to avoid their denaturation. The solution in which the lead halide (II) has been dissolved (lead halide solution) may be saved at room temperature under nitrogen atmosphere until it is used later.

(b) Preparation of a Formamidinium Solution

In the preparation of a formamidinium solution, formamidine acetate salt is mixed in a nonpolar solvent, and oleic acid is added. The nonpolar solvent may be typically octadecane, etc., similarly in the case of the lead halide solution. Since it is also preferable that water and oxygen in the nonpolar solvent have been removed from the solution in which the formamidine acetate salt and oleic acid are mixed, the nitrogen substitution is performed after degassing at room temperature, and further, a dehydration and deoxidation process is carried out by degassing under a temperature condition in which water is evaporated, e.g. at about 120° C., the resultant solution may be saved at room temperature under nitrogen atmosphere until it is used later.

(c) Mixing of the Lead Halide Solution and Formamidinium Solution (Formation of Quantum Dots)

The lead halide solution and formamidinium solution prepared as described above are mixed under a hot condition rather than the room temperature, concretely, under a condition of 60-90° C., and thereby, formamidinium lead halide perovskite quantum dots are formed in the mixed solution. In this respect, in the research of the inventors of the present disclosure, as drawn schematically in FIG. 1A, it has been found that it is possible to form quantum dots which have a stable light-emitting ability for a long period, concretely, of which light-emitting ability hardly changes even when one month passes after their preparation, when both the solutions are mixed by injecting the lead halide solution with a syringe 16 into the formamidinium solution heated in a flask 10, etc. at 60-90° C. using a heating mantle 12, etc. such that the molar ratio of lead ions ($Pb^{2+}$) and formamidinium (FA) ions becomes between 1:3.75-1:15. Therefore, in this embodiment, preferably, as noted above, the mixing of both the solutions may be performed by injecting the lead halide solution with the syringe 16 into the formamidinium solution heated at 60-90° C. (In the method of the prior art, e.g., the method of non-patent document 1, etc., both the solution were mixed by injecting the formamidinium solution with a syringe into the lead halide solution kept at 80° C. in a flask so that the molar ratio of lead ions ($Pb^{2+}$) and formamidinium (FA) ions will be at 1:2.7, and in this way, the solutions turned transparent and their light-emitting ability was lost in about 2 hours after the preparation in many cases. This is probably because, when a relatively large volume of the formamidinium solution is loaded in the syringe in order to obtain the molar ratio of $Pb^{2+}$:FA=1:2.7, the temperature of the solution falls to near the room temperature, and since the formamidinium solution is injected to the lead halide solution in this condition, the temperature in the mixing of the lead halide solution and formamidinium solution falls, and thereby it is considered that it may become difficult to form stable quantum dots.). In this regard, it is preferable to perform the mixing of the lead halide solution and the formamidinium solution under a degassed condition or nitrogen atmosphere in order to avoid the inclusion of water and oxygen in the air into the solution. The temperature in the mixing of both the solutions is monitored with a temperature sensor 14, etc., and the degassing or nitrogen filling in a flask may be performed through a gas transport pipe 18. And after the mixing of the lead halide solution and formamidinium solution, quantum dots which are fine particulates of formamidinium lead halide perovskite crystal, whose surface is coated by ligands (oleic acids, oleylamines) as schematically drawn on FIG. 1B, are formed comparatively promptly, for instance, in about 1 minute, and therefore, after that, the mixed solution is cooled to room temperature or less so that the formation reaction of the quantum dots will be stopped.

(d) Purification of Quantum Dots

Although the quantum dots of the purpose of this embodiment are formed in the above-mentioned mixed solution of the lead halide solution and formamidinium solution, there still remain unreacted precursors which do not form the quantum dots, such as lead ions, formamidinium ions, halogen ions, etc., and those precursors could reduce the apparent light-emitting ability of the quantum dots (The unreacted precursors could re-absorb light emitted by the quantum dots, so that the fluorescence emitted from the solution containing the quantum dots could be reduced.). Thus, the purification process of the quantum dots for removing the unreacted precursors from the above-mentioned mixed solution in which the quantum dots have been formed, i.e., the washing of the quantum dots, is performed. In this respect, in the conventional method (the method of Non-patent document 1, etc.), the quantum dots are purified by repeating twice a cycle of centrifuging the above-mentioned mixed solution; collecting its sediment; re-dispersing the sediment in toluene (the crude quantum dot solution); adding acetonitrile to the crude quantum dot solution so that the ratio of toluene:acetonitrile will be at 3:1 to destabilize the colloids in the solution; centrifuging the solution; discarding the supernatant fluid and collecting the sediment to re-disperse it in toluene, and thereby, the dispersed solution of the quantum dots, exhibiting the photoluminescence quantum yield up to about 70%, has been obtained (It is guessed that the reason why the photoluminescence quantum yield of the dispersed solution of the quantum dots in the conventional method using acetonitrile is up to about 70% is that the acetonitrile liberates the ligands from the quantum dot surface.). On the other hand, in the research of the inventors of the present disclosure, it has been found that, after a crude quantum dot solution is prepared by centrifuging the mixed solution in which the quantum dots have been formed and collecting the sediment; re-dispersing it into an arbitrary nonpolar solvent, such as toluene, etc., which enables quantum dots to be stably dispersed in the colloidal state, it is possible to obtain the dispersed solution of the quantum dots exhibiting the photoluminescence quantum yield achieving from 80% to 100%, as schematically drawn in FIG. 1C, by conducting only one time the following process: adding methyl acetate to the crude quantum dot solution so that the volume ratio of the crude quantum dot solution:methyl acetate will typically be at approximately 1:1 and agitating it; and centrifuging the crude quantum dot solution added with the methyl acetate and dispersing its sediment in a nonpolar solvent. Accordingly, in this embodiment, for the purification process of quantum dots, to the crude quantum dot solution, the approximately same volume of methyl acetate is added, and the sediments obtained by centrifuging the solution may be collected as quantum dots. The collected quantum dots will typically be re-dispersed in a nonpolar solvent, such as toluene, and used for various purposes. In this regard, the sediment obtained by centrifuging the crude quantum dot solution to which methyl acetate has been added may be blown and dried with nitrogen gas (methyl acetate is blown off) before it is re-dispersed in a nonpolar solvent, such as toluene (If the methyl acetate remains in the sediment, it can become a cause of destabilizing colloids of the quantum dots.).

Thus, by preparing quantum dots in accordance with the above-mentioned method of this embodiment, as illustrated in the next column of embodiments, it becomes possible to stably and reproducibly prepare quantum dots, which have an emission wavelength characteristic that the emission wavelength band extends around 800 nm and the full width at half maximum of the peak of the emission wavelength band is about 50 nm or less, and also have a markedly high photoluminescence quantum yield as compared with the prior art, maintaining their light-emitting ability for at least one month.

In order to verify the validity of the present embodiment explained above, the experiments described below were conducted. In this regard, it should be understood that the following embodiments illustrate the validity of the present embodiment only, not intended to limit the scope of the present invention.

Embodiment

In accordance with the above-mentioned method of this embodiment, quantum dots were prepared and their photoluminescence quantum yield was measured as described below. All chemicals used were of chemical grade purity.

(Preparation of Solutions)

In preparation of a lead halide solution, 77 mg $PbI_2$ powder (0.17 mmol 98% Kanto Kagaku) was mixed to 8 ml octadecane (ODE 90% Aldrich) in a 50-ml flask, and while the flask was kept heated at 130° C., the solution was degassed and held for 1 hour. Then, 1 ml oleic acid (OA 90% Aldrich) and 0.5 ml oleylamine (OLA 70% Aldrich) were added to the solution under nitrogen atmosphere, and the solution was agitated until the $PbI_2$ powder was completely dissolved, and the temperature was cooled to room temperature, and thus, the resultant solution was used as the lead halide solution. In preparation of a formamidinium solution, 70 mg formamidine acetate salt (0.67 mmol 99% Aldrich), 2 ml oleic acid (OA 90% Aldrich) and 8 ml octadecane (ODE 90% Aldrich) were mixed in a 50 ml flask, and the solution was degassed at room temperature and held for 30 hour. Then, after the solution was heated and held at 120° C. for 30 minutes under nitrogen atmosphere, the flask was sunk underwater so that the solution was quickly cooled to room temperature, and thus, resultant solution was used as the formamidinium solution.

(Formation of Quantum Dots)

The lead halide solution was kept heated at 80° C. under nitrogen atmosphere, and the formamidinium solution was kept heated at 60° C. to 90° C. and degassed for 15 minutes. After the degassing process, the lead halide solution was injected into the formamidinium solution kept heated at 60° C. to 90° C. in the flask using a syringe. In this injection process, the molar ratio of lead ions and formamidinium ions was controlled to be between 1:3.75 and 1:15. After the injection, the flask was held for 1 minute and then sunk underwater and the solution was cooled (Thereby, the formation reaction of the quantum dots was stopped.). In this regard, for comparison, in accordance with the method described in Non-patent document 1, quantum dots were formed by injecting the formamidinium solution into the lead halide solution in the flask kept heated at 80° C. under nitrogen atmosphere with a syringe (The molar ratio of lead ions and formamidinium ions was made at 1:2.7.), holding the solution for 1 minute, and sinking the flask underwater so that the solution was cooled.

(Purification of Quantum Dots)

In purifying the quantum dots, first, the mixed solution of the formamidinium solution and lead halide solution in which the quantum dots were formed was centrifuged for 2 minutes at 4000 rpm, and, while the supernatant was discarded, a crude quantum dot solution was prepared by re-dispersing the sediment in toluene. Then, to the crude quantum dot solution, the approximately same volume of methyl acetate was added, and after vibrated lightly, promptly, the mixed solution was centrifuged for 2 minutes at 4000 rpm. And after the supernatant was discarded and the sediment (quantum dots) was blown and dried with nitrogen gas, the quantum dot solution was obtained by adding toluene and dispersing the sediment therein. In this regard, for comparison, in accordance with the method described in Non-patent document 1, a quantum dot solution for comparison was prepared by repeating twice the cycle of adding acetonitrile to the crude quantum dot solution so that the crude quantum dot solution:acetonitrile would be at 3:1; vibrating the mixed solution lightly; centrifuging it and dispersing the sediment in toluene while discarding the supernatant.

(Measurement of Photoluminescence Quantum Yield)

The photoluminescence quantum yield of a quantum dot solution was measured by a system schematically drawn in FIG. 2. In this system, a green He—Ne laser (543 nm pms Electro-Optics, LHGR-0050) was used as an excitation light source, and the laser light was introduced into an integrating sphere (Labsphere, 3P-GPS-020-SL) so that the laser light was radiated on a sample solution set in the sphere. Then, while the power of the light which penetrated through the sample solution was measured with a power meter (ADVANTEST: OPTICAL POWERMETER TQ8210), the light which was emitted from the sample solution and reflected and collected in the integrating sphere was introduced through an optical fiber into a spectrometer (Ocean Optics, FLAME-S), where the light amount was measured as a photon count per unit time for every wavelength (resolution at 0.33 nm). In the spectrometer used in this system, after the incident light was divided by wavelength at 0.33 nm of resolution by the spectroscope, the intensities of the respective wavelength components were measured simultaneously by different photodiodes. The measurement and control processing in the spectrometer were performed by computer.

In computing a photoluminescence quantum yield, first, the photon count per unit time and the power of the excitation light were measured with the spectrometer and the power meter, respectively, and the conversion rate of the photon count per unit time of the excitation light and its power in the power meter was computed. Then, a sample solution (quantum dot solution) was set in the integrating sphere, and while the excitation light was radiated, the power of the excitation light which had penetrated through the sample solution was measured and fluorescence emitted from the sample solution and collected by the integrating sphere was led to the spectrometer, where the photon count per unit time of the fluorescence component for every wavelength emitted from the sample solution was measured. And, the photon count per unit time of the excitation light which penetrated through the sample solution was computed from the power of the excitation light which penetrated through the sample solution and the above-mentioned conversion rate, and then, the photon count per unit time of the light absorbed by the sample solution was computed by subtracting the computed photon count per unit time of the excitation light which penetrated through the sample solution from the photon count per unit time of the excitation light. On the other hand, the photon count per unit time of the fluorescence emitted from the sample solution was computed by summing up the photon counts per unit time of the fluorescence components for all wavelengths of the spectrometer. And finally, the photoluminescence quantum yield was computed by dividing the photon count per unit time of the fluorescence emitted from the sample solution by the photon count per unit time of the light absorbed by the sample solution.

(Result)

The following Table 1 shows photoluminescence quantum yields of the quantum dot solutions obtained by performing formation and purification of quantum dots in accordance with the above-mentioned method of this embodiment or the conventional method. In each column, the upper row shows the average value of the calculated values of the photoluminescence quantum yields, and the numerical width in the parenthesis of the lower row shows the minimum and the maximum of the calculated values of the photoluminescence quantum yields.

TABLE 1

| | | Photoluminescence quantum yield | |
|---|---|---|---|
| Measurement time | Purification method Washing solvent | The formation method of this embodiment Molar ratio $Pb^{2+}:FA = 1:11.25$ Formation temperature: 60° C. | The conventional formation method Molar ratio $Pb^{2+}:FA = 1:2.7$ Formation temperature: 80° C. |
| Immediately after preparation | This embodiment Methyl acetate | 100% (98-102%) | 89% (87-91%) |
| | The conventional method Acetonitrile | 66% (65-67%) | 60% (58-62%) |
| 2 hours after Preparation | This embodiment Methyl acetate | 100% (99-104%) | 0% (no emission) |
| | The conventional method Acetonitrile | 66% (64-68%) | 0% (no emission) |
| One month after Preparation | This embodiment Methyl acetate | 100% (99-103%) | 0% (no emission) |
| | The conventional method Acetonitrile | 66% (65-67%) | 0% (no emission) |

With reference to Table 1, first, with respect to the formation of quantum dots, in the case of the conventional method, although significant fluorescence was observed immediately after preparation and the photoluminescence quantum yield of about 60% or about 90% was measured, the solution turned transparent in 2 hours after preparation, where fluorescence was no longer emitted when the solution was irradiated with the excitation light, and the calculated value of the photoluminescence quantum yield was 0. This is considered because the quantum dots were decomposed immediately after their preparation. On the other hand, in the case of this embodiment, as shown in the table, the photoluminescence quantum yields of about 66% or about 100% measured immediately after the preparation were maintained even at one month after the preparation. Thereby, with respect to the formation of quantum dots, it has been shown that, according to the method of this embodiment, it is possible to reproducibly and stably form durable quantum dots whose light-emitting ability does not fall for at least one month.

Moreover, as shown in Table 1, with respect to the formation of quantum dots performed by the method of this embodiment and by the conventional method, the photoluminescence quantum yield of the quantum dot solution in the case of the method of this embodiment using methyl acetate in the purification process became markedly higher than those in the case of the conventional method using acetonitrile. In the case of the conventional purification method using acetonitrile, the photoluminescence quantum yield was 60% (in the case of the conventional formation method) or 66% (in the case of the formation method of this embodiment). On the other hand, according to the purification method of this embodiment using methyl acetate, the photoluminescence quantum yield was improved to 89% (in the case of the conventional formation method) or 100% (in the case of the formation method of this embodiment). These results indicate that, according to the purification method of quantum dots by this embodiment using methyl acetate, there can be obtained quantum dots exhibiting a higher photoluminescence quantum yield with a smaller amount of solvent in a shorter process than before.

Next, the following table 2 shows photoluminescence quantum yields and emission wavelength characteristics of quantum dot solutions when the molar ratio of lead ions and formamidinium ions in the formation of quantum dots and the formation temperature (the temperature held in the formamidinium solution in the formation of quantum dots) were changed in the case that the formation and purification of quantum dots were performed in accordance with the above-mentioned method of this embodiment. Further, FIG. 3 shows the emission spectra of the quantum dot solutions in the respective cases of the molar ratios of lead ions and formamidinium ions in the formation of quantum dots corresponding to Table 2.

TABLE 2

| Molar ratio $Pb^{2+}:FA$ | Formation temperature (° C.) | Quantum yield Immediately after preparation (%) | Quantum yield One month after preparation (%) | Emission wavelength Peak (nm) | Peak Full width at half maximum |
|---|---|---|---|---|---|
| 1:3.75 | 60 | 89 | 89 | 740 | 68 |
| 1:7.5 | 60 | 96 | 96 | 754 | 48 |
| 1:11.25 | 60 | 100 | 100 | 759 | 48 |
| 1:15 | 60 | 83 | 83 | 782 | 42 |
| 1:15 | 80 | 81 | 81 | 790 | 57 |
| 1:15 | 90 | 76 | 76 | 793 | 85 |

With reference to Table 2 and FIG. 3, first, it has been shown that, according to the method of this embodiment, it is possible to prepare stable quantum dots exhibiting the photoluminescence quantum yield of 80% or more, higher than before, for at least on month in all the cases that the molar ratio of lead ions and formamidinium ions in the formation of quantum dots is in the range of 1:3.75-1:15. In particular, as understood also from FIG. 3, it has been shown that, when $Pb^{2+}$:FA is equal to 1:11.25, it is possible to prepare quantum dots preferably with high fluorescence intensity, whose photoluminescence quantum yield reaches to 100%. Moreover, it has also been shown that, in the method of this embodiment, in the case that the temperature in the formation of quantum dots is at 60-80° C., quantum dots whose photoluminescence quantum yield is higher than 80% can be prepared, and also in the case that the temperature in the formation of quantum dots is at 90° C., stable quantum dots whose photoluminescence quantum yield is 75%, higher than before, can be prepared. Furthermore, in the any cases of Table 2, the peak emission wavelengths were longer than 740 nm and the emission wavelength bands extend around 800 nm. Also, the full widths at half maximum at the peaks of the emission wavelength bands were about 50 nm or less.

Thus, according to this embodiment, with respect to the preparation of quantum dots, it has been found that, in forming the quantum dots by mixing a formamidinium solution and a lead halide solution, it is possible to reproducibly and stably form durable quantum dots whose light-emitting ability does not decrease for at least one month by the manner of injecting the lead halide solution into the formamidinium solution, and further that in purifying the quantum dots from the crude quantum dot solution, it is possible to obtain the quantum dots exhibiting the photoluminescence quantum yield higher than before, reaching even to 100%, by using methyl acetate as a solvent for purification, instead of acetonitrile.

Although the above explanation has been described with respect to embodiments of the present disclosure, it will be apparent for those skilled in the art that various modifications and changes are possible, and that the present disclosure is not limited to the above-illustrated embodiments and may be applied to various devices and apparatus without deviating from the concepts of the present disclosure.

The invention claimed is:

1. A method of preparing formamidinium lead halide perovskite quantum dots, comprising steps of:
   (a) preparing a lead halide solution by dissolving lead halide (II), oleic acid and oleylamine in a nonpolar solvent;
   (b) preparing a formamidinium solution by dissolving formamidine acetate salt and oleic acid in a nonpolar solvent;
   (c) mixing the formamidinium solution and the lead halide solution under hot conditions to form formamidinium lead halide perovskite quantum dots;
   (d) purifying the quantum dots by centrifuging the mixed solution of the formamidinium solution and the lead halide solution in which the quantum dots have been formed to obtain sediment; dispersing the sediment in a nonpolar solvent to prepare a crude quantum dot solution; mixing the crude quantum dot solution with methyl acetate; and centrifuging the crude quantum dot solution mixed with the methyl acetate to obtain sediment as purified quantum dots.

2. The method of claim 1, wherein a volume ratio of the methyl acetate and the crude quantum dot solution in the mixing is substantially 1:1 in the step (d).

3. The method of claim 1, wherein the formamidinium solution and the lead halide solution are mixed under a temperature condition at 60° C.-90° C. in the step (c).

4. The method of claim 1, wherein the formamidinium solution and the lead halide solution are mixed by injecting the lead halide solution into the formamidinium solution in the step (c).

5. The method of claim 1, wherein the formamidinium solution and the lead halide solution are mixed such that a molar ratio of lead ions and formamidinium ions becomes from 1:3.75 to 1:15 in the step (c).

6. The method of claim 5, wherein the formamidinium solution and the lead halide solution are mixed such that a molar ratio of lead ions and formamidinium ions becomes substantially 1:11.25.

7. A method of preparing formamidinium lead halide perovskite quantum dots, comprising steps of:
   (e) preparing a lead halide solution by dissolving lead halide (II), oleic acid and oleylamine in a nonpolar solvent;
   (f) preparing a formamidinium solution by dissolving formamidine acetate salt and oleic acid in a nonpolar solvent;
   (g) mixing the formamidinium solution and the lead halide solution by injecting the lead halide solution into the formamidinium solution heated at 60° C.-90° C. to form formamidinium lead halide perovskite quantum dots.

8. The method of claim 7, wherein the formamidinium solution and the lead halide solution are mixed such that a molar ratio of lead ions and formamidinium ions becomes from 1:3.75 to 1:15 in the step (c).

9. The method of claim 7, wherein the formamidinium solution and the lead halide solution are mixed such that a molar ratio of lead ions and formamidinium ions becomes substantially 1:11.25.

* * * * *